United States Patent [19]
Yamanaka et al.

[11] 3,750,977
[45] Aug. 7, 1973

[54] STRIPPING AND FEEDING DEVICE FOR STRIP MATERIAL

[75] Inventors: Torakiyo Yamanaka, Yokohama; Yoshihiro Shigeta; Kuniyoshi Suzaki, both of Tokyo, all of Japan

[73] Assignee: Canon Kabushiki Kaisha, Tokyo, Japan

[22] Filed: Oct. 4, 1971

[21] Appl. No.: 186,010

[30] Foreign Application Priority Data
Oct. 5, 1970  Japan................................. 45/87360

[52] U.S. Cl............................... 242/192, 352/157
[51] Int. Cl...... G03b 1/04, G03b 1/56, G11b 15/32
[58] Field of Search............ 242/186, 192, 197–200; 352/72–78, 157, 158

[56] References Cited
UNITED STATES PATENTS

| | | | |
|---|---|---|---|
| 3,670,989 | 6/1972 | Andrews | 242/192 |
| 3,429,518 | 2/1969 | McKee | 242/186 |
| 3,544,206 | 12/1970 | Freudenschusz | 352/72 |
| 3,628,749 | 12/1971 | Ort et al. | 242/186 |
| 3,603,529 | 9/1971 | Bundschuh | 242/197 |

*Primary Examiner*—Leonard D. Christian
*Attorney*—Joseph M. Fitzpatrick, John Thomas Cella et al.

[57] ABSTRACT

A cineprojector or similar device is provided with restraining means for controlling the entry of stripping means into a cartridge in use so as to ensure a strip material such as film to be smoothly stripped and threaded from a roll of such material irrespective of the variable size of the cartridge. Means for driving stripping means and threading means in association with each other is provided to simplify the operation of the device.

12 Claims, 5 Drawing Figures

PATENTED AUG 7 1973  3,750,977

STRIPPING AND FEEDING DEVICE FOR STRIP MATERIAL

BACKGROUND OF THE INVENTION

1. Field of the Invention

This invention relates to a stripping and feeding device for strip material such as the film used with a cineprojector or the like.

2. Description of the Prior Art

Machines such as cineprojector, microfilm reader and tape recorder which are adapted to use a cartridge containing therein a film, tape or other strip material have been finding wider and wider uses. The recent development of cartridges having different volumes or different sizes has given rise to the requirement that such various types of cartridge must be able to be mounted for use in the same cineprojector or the like. To meet this requirement, a stripper for stripping a leader film or tape off a roll of film or tape must be made such that the entry of the stripper into the opening of the cartridge is controlled so as to ensure the stripper to take a stripping position with respect to the roll of film or tape irrespective of the size of the cartridge.

An approach to this problem has been proposed by U. S. Pat. No. 3,429,518 which discloses a spring-supported, pivotable stripper and, in case of small-diametered rolls, an outer curved surface having a radius R equal to the distance from the pivot to the outer curved surface of the stripper so as to bring the pawl-like end portion of the stripper into the stripping position for the roll. However, this method has been disadvantageous in that it requires a stripper of different shape to be used for a different size of cartridge or a different diameter of the roll in the cartridge, thus failing to provide a simple means.

SUMMARY OF THE INVENTION

It is an object of the present invention to provide a stripping and feeding device for strip material which has eliminated the foregoing disadvantages and permits the use of the same stripper irrespective of the variable size of the cartridge in use.

It is another object of the present invention to provide a stripping and feeding device for strip material which has a stripper pivotally movable with respect to the body of the device and provided with a camming surface so that as it enters a cartridge opening the camming surface of the stripper is restrained by a stripper restraing member provided on the body of the device to thereby control the angle at which the stripper enters the cartridge.

It is still another object of the present invention to provide a stripping and feeding device for strip material which has an intermediate slider for pivotally supporting a stripper resiliently mounted for pressure contact with a roll of strip material and a start slider, both sliders being actuated in association with each other to permit the stripper to retract from the cartridge opening.

It is yet another object of the present invention to provide a stripping and feeding device for strip material in which means for imparting to a roll of strip material a rotational movement in its rewinding direction is operatively associated with the start slider to remove any slack in the roll before it is stripped.

It is a further object of the present invention to provide a stripping and feeding device for strip material in which the start slider movable with respect to the body of the device is operatively associated with threading means adapted for pressure contact with a roll of strip material to thread the strip material from the roll and the intermediate slider movable with respect to the body of the device is operatively associated with the stripper adapted for contact with the roll of strip material to strip the strip material off the roll, thereby defining a threading passage for the strip material from the roll between the adjacent sides of the threading means and the stripper, and further the intermediate and start sliders may be returned to their initial positions to thereby release the stripping operation for the roll of strip material.

Other objects and features of the present invention will become fully apparent from the following detailed description of embodiments thereof taken in conjunction with the accompanying drawings.

DESCRIPTION OF THE PREFERRED EMBODIMENTS

Figure 1:
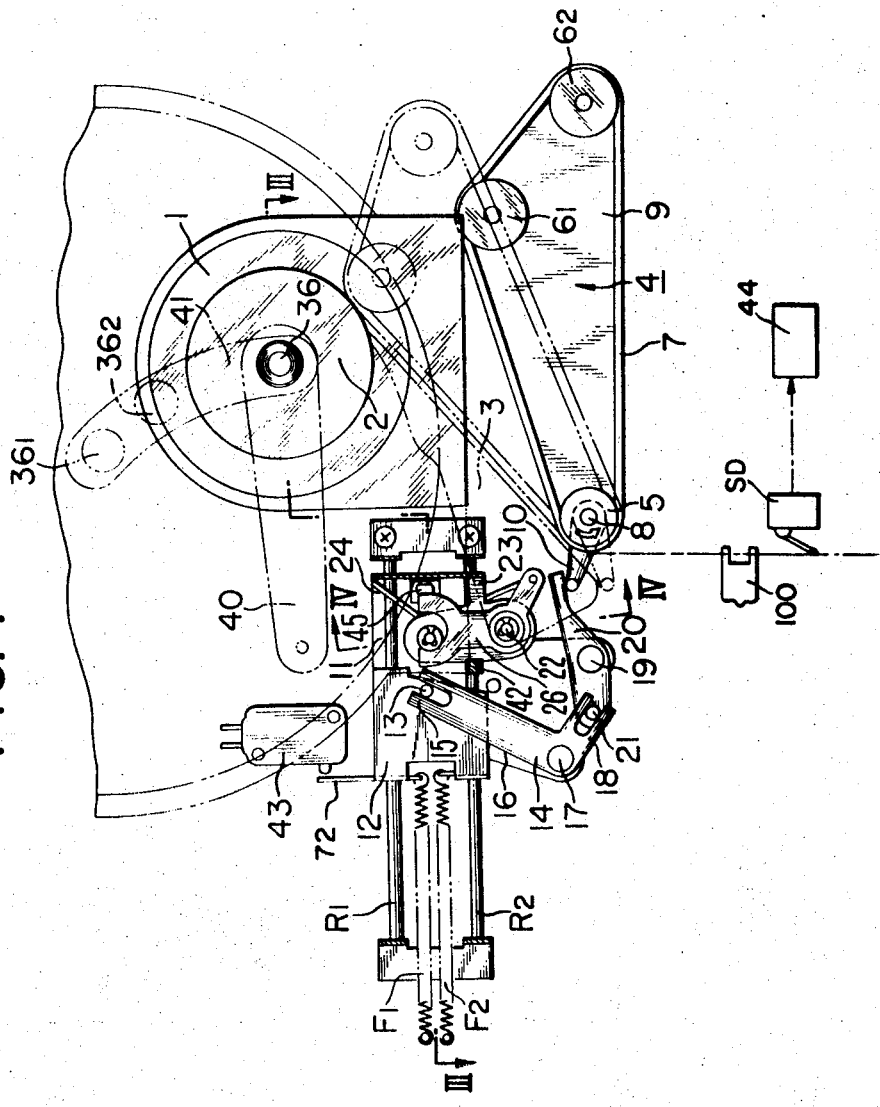
FIG. 1 is a front view of the device according to the present invention.
Figure 2:
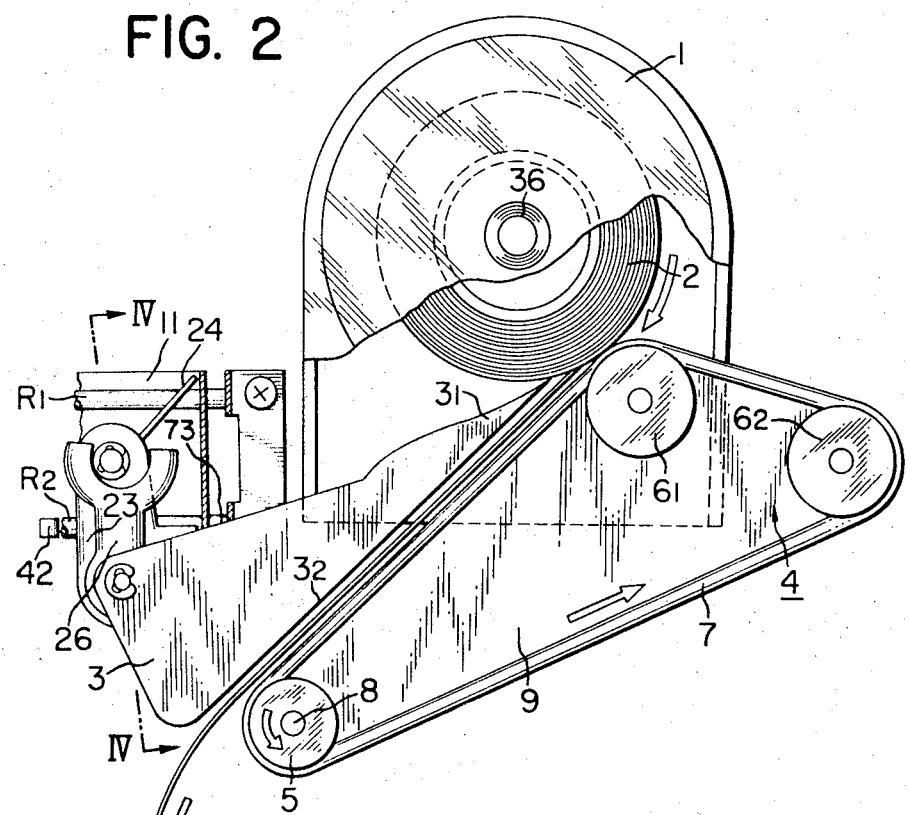
FIG. 2 is a front view of the essential parts of the device shown in FIG. 1 as it is in the stripping and feeding position.

Various components of the device according to the present invention are shown in FIGS. 1 to 4. A cartridge, desgnated by numeral 1, contains therein a roll of strip material 2 such as film. In FIGS. 1 and 2, the cartridge 1 is shown as a compact type but a larger-sized cartridge may be inserted in the device as indicated by circular imaginary lines. A stripper 3 is pivotally supported by an intermediate slider to be described, and has a pointed end portion $3_1$ adapted to resiliently contact the outermost periphery of the roll of strip material in a stripping direction to thereby strip the strip material off the roll, and a strip passage surface $3_2$ along which the leader end portion of the stripped material may be guided. Threading means for the strip material, generally designated by numeral 4, is provided adjacent to the roll of strip material 2 and to the stripper 3. The threading means 4 includes a driving roller 5 rotatably journalled to the body of the device, two driven rollers $6_1$ and $6_2$, an endless belt 7 extending over the three rollers, and a base plate 9 carrying thereon the three rollers 5, $6_1$ and $6_2$ and pivotally movable about a driving roller shaft 8. On the driving roller shaft 8 there is integrally mounted a driving lever 10 for pivotally moving the entire threading means 4 to urge the same into contact with the outermost periphery of the strip roll. The belt 7 may be of circular or rectangular cross section having a diameter or width smaller than the width of the strip material, and may be formed of rubber or any other conventional material. The driven roller $6_1$ may preferably have a smaller diameter than the initial diameter of the strip roll so as to facilitate the rotation of the latter.

Figure 3:
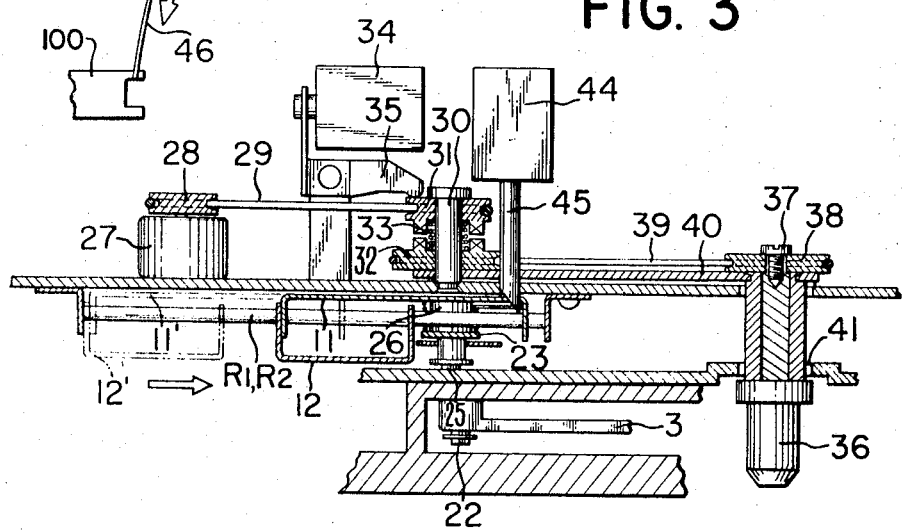
FIG. 3 is a sectional view taken along lines III—III in FIG. 1.
Figure 4:
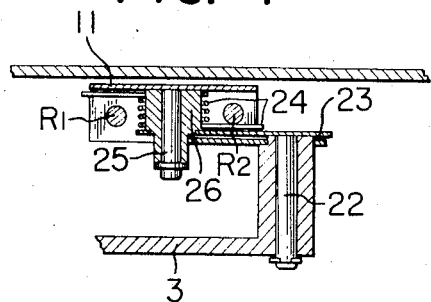
FIG. 4 is a fragmentary sectional view taken along lines IV—IV in FIG. 2.

An intermediate slider 11 is slidably mounted with respect to the body of the device, and is operatively associated with the stripper 3 in the manner as will later be described with reference to FIGS. 3 and 4. A start slider 12 is also slidably mounted with respect to the body of the device. These two sliders 11 and 12 are slidable from their initial positions 11' and 12' (imaginary lines in FIG. 3) along a pair of slider guide rails R1 and R2 fixed to the body of the device (FIGS. 1 and 3). Two coil springs F1 and F2 are provided to return the start and intermediate sliders 12 and 11 to their initial positions respectively, as shown in FIG. 1. More specifically, one end of the coil spring F1 is connected to the start slider 12 and one end of the coil spring F2 is connected to the intermediate slider 11, while the other ends of these coil springs are connected to the body of the device.

The start slider 12 has a studded pin 13 (FIG. 1), which is engaged with a recessed end 15 of an L-shaped change-over lever 14 pivotally mounted on a shaft 17 studded in a retaining member 16 fixed to the intermediate slider 11. The other recessed end 18 of the change-over lever 14 is also engaged with a pin 21 fixed to one end of a connecting lever 20 which is pivotally mounted on a shaft 19 studded in retaining member 16. The other end of the connecting lever 20 is engageable with one end of the driving lever 10 of the aforesaid threading means.

The operative association between the stripper 3 and the intermediate slider 11 will now be described with reference to FIGS. 1 and 4. The stripper 3 is supported by a stripper support shaft 22 on a stripper support plate 23, which is integral with a pivotable arm 26 pivotally mounted on a shaft 25 fixed to the intermediate slider 11 by means of a moving mechanism including a spring 24. Thus, the pivotable arm 26 is pivotally movable with the stripper 3 about the support shaft 22 and, as shown in FIG. 1, one end of the arm 26 is engaged with the shaft 25 while carrying one end of the coil spring 24, thereby normally imparting a counterclockwise rotational force to the stripper 3.

Actually, the roll of strip material contained in the cartridge often tends to be slack before the strip material is unwound, and such slack must be removed initially. Means for removing such slack in the roll of strip material is shown in FIG. 3, wherein a motor 27 secured to the body of the device has a pulley 28 secured to the rotary shaft thereof. An endless belt 29 is wrapped around the pulley 28 and another pulley 31 rotatable about a clutch shaft 30. A further pulley 32 is rotatably mounted on the clutch shaft 30. The pulleys 31 and 32 are connected together by a clutch 33. A plunger magnet 34 having an actuating member 35 is mounted on the body of the device to actuate the clutch 33. A rotary shaft 36 for the cartridge is coupled to a pully 38 by means of a screw 37. The pulleys 32 and 38 are rotatably connected together by an endless belt 39.

A shaft holder 40 is pivotally mounted on the clutch shaft 30 secured to the body of the device, and slot or escape means 41 is provided to permit circular displacement of the rotary shaft 36 during the pivotal movement of the shaft holder 40. As shown in FIG. 1, the rotary shaft 36 may be positioned at any desired one of various positions 36, $36_1$, $36_2$, etc. in accordance with the variable size of the cartridge so as to enable any different size of cartridge to be properly placed on the rotary shaft 36. Such positioning mechanism for the rotary shaft 36 may employ a click or similar mechanism which suitably permits pressure contact in accordance with a spindle drive or a rim drive. In the illustrated embodiment, the mechanism is shown as the spindle drive type.

The other components of the present invention will become apparent from the following description directed to the operation of the device according to the invention.

First, removal of the slack present in the roll of strip material will be described hereunder. As shown in FIGS. 1 and 3, the start slider 12 is manually slidden to its right end position as shown by the arrow in FIG. 3 to cause a projection 72 secured at one end of the start slider 12 opposing a micro-switch 43 to close and thereby energize the plunger magnet 34, whose actuating member 35 in turn brings the clutch 33 into engagement. Thus, the rotation of the motor 27 is transmitted to the rotary shaft 36 for the cartridge through the belts 29 and 39. As the result, the cartridge rotating shaft 36 continues to rotate in the direction opposite to the stripping direction during the while the slider 12 remains in its right end position, whereby the initial slack in the roll of the strip material is removed.

Next, the operation for stripping and feeding the roll of strip material with the device of the present invention will be described by reference to FIGS. 1 to 4. When the start slider 12 is rightwardly slidden from its initial position along the guide rails R1 and R2 against the force of the spring F1, the intermediate slider 11 is also caused to slide rightwardly against the force of the spring F2 together with the start slider 12. With the rightward movement of the intermediate slider 11, the stripper 3 carried thereon advances into the opening formed in the cartridge 1 until it is brought into resilient contact with the roll of the strip material in the cartridge. In order to restrict the entry of the stripper 3 into the cartridge opening, a restraining member 42 is studded in the body of the device according to the present invention. The restraining member 42 may be a pin fixed to the device body or a part of the housing wall of the device. The upper side edge of the stripper 3, as viewed in FIG. 1 or 2, is formed into a camming surface 73 which is adapted to bear against the restraining member 42 and to slide in contact therewith as the stripper 3 advances into the cartridge, whereby the stripper 3 may be angularly rotated to a level above the restraining member 42 to ensure the end portion 3, of the stripper to exactly bear against the leading end of the strip roll which is to be stripped.

The microswitch 43 remains closed during the while the start slider 12 together with the intermediate slider 11 is in its right end position, so that the cartridge rotating shaft 36 is rotated in the counter-clockwise direction so as to remove any slack in the rolled strip material before it is unwound. At the same time, the stripper 3 is in resilient contact with the leading end of the rolled strip material, as shown by the imaginary outline in FIG. 1. In this position, the stripper 3 also acts as a suppresser for the strip material.

The removal of the slack in the roll is followed by a stripping operation, which will take place in the manner described hereunder.

When the manual rightward movement of the start slider 12 is discontinued, this slider 12 tends to be returned to its initial position by the force of the coil spring F1, but such tendency of the start slider 12 is interrupted because the tapered end portion of the actuating shaft 45 of a plunger magnet 44 secured to the device body is then received in a small aperture formed in the intermediate slider 11 to thereby retain this slider 11 against movement. Thus, the stripper 3 is held in pressure contact with the leading end of the rolled strip. On the other hand, the aforesaid tendency of the start slider 12 to move leftwardly to its initial position causes the change-over lever 14 having one end 15 thereof engaged with the pin 13 on that slider to rotate counter-clockwise about the shaft 17, whereby the other end 18 of the change-over lever 14 causes the connecting lever 20 having its pin 21 engaged with said end 18 to rotate in the clockwise direction, and finally the connecting lever 20 causes the driving lever 10 of the threading means 4 to rotate counter-clockwise about the driving shaft 8. Thus, the threading means 4 is advanced into the opening in the cartridge 1 until it reaches the position as indicated by the imaginary outline in FIG. 1, thereby engaging the leading end of the rolled strip material. With such engagement, the driving lever 10 is maintained in its counter-clockwisely rotated position, and therefore the various levers associated with the lever 10 have their extents of angular movement determined and accordingly the extent of the backward or leftward movement of the start slider 12 is also determined.

The mode of the stripping thus achieved is best shown in FIG. 2. The leader end portion 46 of the rolled strip material is caught by the pawl-like end portion 3₁ of the stripper 3 and separated from the subsequent turn of the strip material. The leading end portion 46 thus separated is driven by the belt 7 driven from the driving roller 5 so as to move along the strip passage defined between the outer threading surface of the belt 7 and the opposed passage surface 3₂ of the stripper 3. As soon as the leader end portion 46 reaches a station where it is to be taken off by a claw 100, a switch SD for detecting the presence of the strip material is actuated to energize the plunger magnet 44, which thus attracts its actuating member 45 to release the intermediate slider 11 from its retained condition. Thus, the intermediate slider 11 is permitted to return toward its initial position, whereby the retaining plate 16 supporting the pivot shafts 17 and 19 of the change-over lever 14 and connecting lever 20 is also permitted to return leftwardly. As the result, the stripper 3 is retracted from the cartridge opening while controlled together with the intermediate slide 11 by the restraining member 42, and at the same time the connecting lever 20 is disengaged from the driving lever 10 of the threading means 4. Thus, the threading means 4 is also retracted from the cartridge opening to its initial position as shown by the solid outline in FIG. 1.

Figure 5:
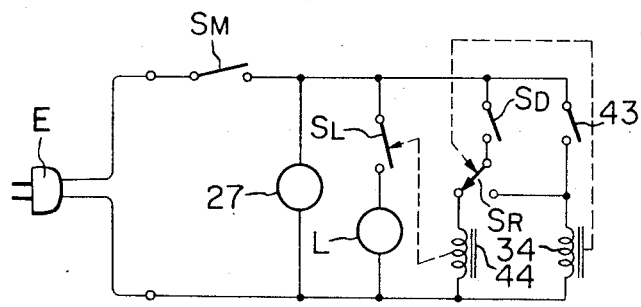
FIG. 5 is a diagram of the electric circuit in the device of the present invention.

The operation of the entire device of the present invention will now be discussed by reference to the circuit diagram of FIG. 5. In the shown electric circuit, SM designates a main switch and numeral 43 indicates the aforesaid microswitch for removing the slack in the roll of strip material. As described previously, the microswitch 43 remains closed to energize the plunger magnet 34 for removing the slack in the roller strip as long as the start slider 12 is maintained in its right end position as viewed in FIG. 1. SD is a detecting switch for detecting the presence of the strip material and adapted to close when the stripping mechanism begins its stripping action to thread the strip material properly from the roll. As soon as the detecting switch SD is closed, the plunger magnet 44 forming the means of releasing the stripping mechanism is energized to permit the stripper and the threading means to retract from the cartridge opening. Also closed is a switch SL for maintaining the ON state of an indicator means for indicating the operative condition of a projector lamp L or the like. A switch SR for detecting any reverse tension which may occur in the strip material such as film at the end of a cineprojection is connected in the shown manner to thereby reenergize the plunger magnet 34 so as to cause the detecting switch SR to self-hold. Thus, after the strip material such as film has been completely rewound and the detecting switch SD is opened, the electric circuit continues to operate an unshown ventilator means rotatable by the motor 27 through the main switch SM connected with a power source E, thereby preventing the projector machine from being heated by the lamp L. The lamp L is already turned off when the detecting switch SR is closed by the plunger magnet 34 and the lamp switch SL opened by the other plunger magnet 44.

Thus, according to the present invention, the one-touch action of the start slider ensures the removal of any slack present in the rolled strip material within the cartridge as well as the ready and simple stripping and feeding of the leader end portion of the strip material. Further, cartridges of various sizes can be used and in such cases, the sliding contact between the camming surface formed in the stripper and the restraining member provided on the device body acts to smoothly control the entry of the stripper into the cartridge, thereby readily enabling replacement of cartridges.

We claim:

1. A device for stripping a leader end portion off a roll of strip material having such leader end portion and for feeding the strip material, said device comprising:
   stripping means having an end portion adapted for resilient contact with said rolled strip material to strip the leader end portion off said roll of strip material, and a strip passage surface adapted to direct the stripped leader end portion from said rolled strip material in a threading manner;
   threading means adapted to make a pressure contact with said roll of strip material to rotate the same so that said leader end portion of said rolled strip material is directed toward said stripping means, said threading means having a strip threading surface disposed in opposed and cooperable relationship with said strip passage surface of said stripping means so that the stripped leader end portion is threaded away from said roll of strip material when the roll is rotated by said threading means;
   driving means including a start slider movable with respect to the body of the device and adapted to urge said threading means into contact with said roll of strip material, and an intermediate slider movable with respect to the body of the device and carrying said stripping means pivotally thereon; and
   restraining means for said stripping means, said restraining means being adapted to control the extent of angular movement of said stripping means pivotally carried on said intermediate slider.

2. A device as defined in claim 1, wherein said threading means includes: means includes:
  a driving roller;
  two driven rollers spaced apart from said driving roller;
  said driving roller and said driven rollers being so disposed as not to be juxtaposed on a straight line;
  an endless belt extending over said three rollers, said belt being driven from said driving roller and having a stretched portion defining said strip threading surface; and
  a base plate carrying said three rollers for rotation thereon and pivotally mounted on the shaft of said driving roller.

3. A device as defined in claim 2, wherein said threading means further includes a driving lever secured to said driving roller shaft to cause said threading means to pivotally move into pressure contact with said roll of strip material.

4. A device as defined in claim 2, wherein one of said driven rollers is adapted to urge said endless belt into contact with said roll of strip material so as to drive the latter, said one driven roller having a diameter smaller than the initial diameter of said roll.

5. A device as defined in claim 1, wherein said stripping means further includes a camming surface formed on the opposite side to said strip passage and adapted to make a sliding contact with said restraining means.

6. A device as defined in claim 1, wherein said driving means further includes a mechanism for causing said start slider to slide and thereby causing said intermediate slider to slide with said start slider, and a mechanism for retaining said intermediate slider against movement upon release of said start slider from its sliding motion, whereby said threading means may be urged into contact with said roll of strip material and said stripping means brought into resilient contact with said roll.

7. A motion picture projector for projecting a rotatable roll of film having a leader end portion, comprising:
  means for rotatably supporting the roll of film;
  stripping means including an end portion adapted to bear against the rolled film so as to strip said leader end portion of said film off the roll, and a film passage surface adapted to direct said stripped leader end portion from said roll in a threading manner;
  threading means adapted to make a pressure contact with said roll of film to rotate the same so that said leader end portion of the rolled film is directed toward said stripping means, said threading means including a film threading surface provided in opposed and cooperable relationship with said film passage surface of said stripping means so as to thread said stripped film leader end portion from said roll when said roll of film is rotated by said threading means;
  driving means slidable with respect to the body of said motion picture projector, said driving means including a start slider adapted to urge said threading means into contact with said roll of film, and an intermediate slider for carrying said stripping means pivotally thereon; and
  restraining means for said stripping means fixed to the body of said motion picture projector, said restraining means being adapted to bear against said stripping means so as to control the extent of angular movement of said stripping means.

8. In a motion picture projector for projecting a rotatable roll of film having a leader end portion, the improvement comprising:
  a stripper member adapted to resiliently contact the roll of film in a film unwinding direction during the rotation of said film roll and to strip the film leader end portion off said roll, said stripper member defining a film passage surface for threading the stripped film leader end portion from said roll;
  a movable endless belt member adapted to make a pressure contact with said roll of film in the film unwinding direction in the vicinity of said stripper member and to drive said roll of film for rotation, said belt member defining a film threading surface opposed to and spaced apart from said film passage surface of said stripper member so as to provide a film passage for directing therethrough said film leader end portion from said roll;
  a driving member slidable with respect to the body of said motion picture projector, said driving member including a start slider for urging said movable belt into contact with said film roll, and an intermediate slider for carrying said stripper member pivotally thereon;
  a restraining member for said stripper member fixed to the body of said motion picture projector, said restraining member being adapted to bear against said stripper member so as to control the extent of angular movement of the latter.

9. In a combination of a cartridge of varying size containing therein a rotatable roll of film having a leader end portion and having an opening for permitting access to said roll of film from outside the cartridge, and a motion picture projector capable of unwinding and projecting the rolled film in said cartridge irrespective of the size of the cartridge, said projector comprising:
  rotatable means for carrying said cartridge thereon and rotatably mounting thereon the roll of film in said cartridge;
  stripping means including an end portion adapted to advance into said cartridge through said cartridge opening to bear against the rolled film and thereby strip the leader end portion off said film roll, said end portion of said stripping means being also adapted to react from said cartridge opening upon completion of the stripping action, a film passage surface for directing the stripped film leader end portion from said roll in a threading manner, and a camming surface provided on the other side than said film passage surface;
  threading means pivotally movable with respect to the body of said motion picture projector, said threading means including a film threading portion adapted to advance into said cartridge through said cartridge opening to make a pressure contact with the rolled film while permitting the rotation of the latter and thereby thread the film leader end portion, said film threading portion being also adapted to retract from said cartridge opening upon completion of the threading action, and a film threading surface provided in opposed and cooperable relationship with said film passage surface of said stripping means;

driving means supported by the body of said motion picture projector and slidable toward the loaded position of said cartridge, said driving means including a start slider for retractably advancing said threading means through said cartridge opening into pressure contact with said film roll, and an intermediate slider for carrying said stripping means pivotally thereon and for retractably advancing said end portion of said stripping means into said cartridge through said cartridge opening; and restraining means for said stripping means, said restraining means being adapted to engage said camming surface of said stripping means to thereby control the advancement of said stripping means into said cartridge.

10. A device for stripping a leader end portion off a roll of strip material having such leader end portion and for feeding the strip material, said device comprising:

stripping means having an end portion adapted for resilient contact with said rolled strip material to strip the leader end portion off said roll of strip material, and a strip passage surface adapted to direct the stripped leader end portion from said rolled strip material in a threading manner;

threading means including a strip threading surface adapted to make a pressure contact with said roll of strip material and rotate the same so as to direct the leader end portion of said rolled strip toward said stripping means, said strip threading surface being provided in opposed and cooperable relationship with said strip passage surface of said stripping means for threading the stripped leader end portion from said roll;

driving means including a start slider movable with respect to the body of said device and adapted to urge said threading means into contact with said roll of strip material, and an intermediate slider movable with respect to the body of said device and carrying said stripping means pivotally thereon; and means operatively associated with said driving means for removing any slack in the roll of strip material, said last-named means being driven by the sliding movement of said start slider of said driving means to reversely rotate a rotatable shaft for supporting said roll of strip material and stopped upon release of said start slider from its sliding movement.

11. A device for stripping a leader end portion off a roll of strip material having such leader end portion and for feeding the strip material, said device comprising:

pivotally movable stripping means having an end portion adapted for resilient contact with said rolled strip material to strip the leader end portion off said roll of strip material, and a camming surface formed on that side of said stripping means opposed to said roll of strip material so as to control the extent of angular movement of said stripping means;

driving means including a start slider movable with respect to the body of the device and an intermediate slider movable with respect to the body of the device and carrying said stripping means pivotally thereon;

restraining means for said stripping means, said restraining means being adapted to control the extent of angular movement of said stripping means pivotally carried on said intermediate slider; and means operatively associated with said driving means for removing any slack in the roll of strip material, said last-named means being driven by the sliding movement of said start slider of said driving means to reversely reotate a rotatable shaft for supporting said roll of strip material and stopped upon release of said start slider from its sliding movement.

12. In a motion picture projector provided with means for supporting a cartridge containing therein a roll of film having a leader end portion, means defining a film passage, and a film take-off claw disposed in said film passage to feed the film, the improvement comprising:

pivotally movable threading means adapted to move between a first position for making a pressure contact with the roll of film in a film unwinding direction so as to thread the film from said roll and rotate said roll and a second position for inhibiting the pressure contact with and rotation of said film roll;

pivotally movable film stripping means adapted to assume a first position for stripping the film leader end portion off said film roll when said film roll is rotated by said threading means and a second position for inhibiting the stripping action with respect to said film roll;

said stripping means and said threading means being cooperable with each other in their respective first positions to provide a film passage for guiding therethrough said film leader end portion;

means for moving said threading means and stripping means from their respective second positions to their respective first positions including a first sliding means for moving said threading means and a second sliding means operatively engaged with said first sliding means for moving said stripping means thereby enabling said film leader end portion to be stripped off said film roll and guided along said film passage to the take-off claw; and operating means for detecting and responding to the arrival of said film leader end portion at said take-off claw and being effective to move said threading means and stripping means from their respective first positions to their respective second positions.

* * * * *